(12) United States Patent
Rejniak et al.

(10) Patent No.: US 10,378,544 B2
(45) Date of Patent: Aug. 13, 2019

(54) APPARATUS, SYSTEMS AND METHODS FOR PROTECTING PUMPS

(71) Applicants: Brian Rosser Rejniak, Yorba Linda, CA (US); John Alan Rejniak, Corona, CA (US)

(72) Inventors: Brian Rosser Rejniak, Yorba Linda, CA (US); John Alan Rejniak, Corona, CA (US)

( * ) Notice: Subject to any disclaimer, the term of this patent is extended or adjusted under 35 U.S.C. 154(b) by 676 days.

(21) Appl. No.: 14/949,658

(22) Filed: Nov. 23, 2015

(65) Prior Publication Data

US 2016/0298637 A1    Oct. 13, 2016

Related U.S. Application Data

(60) Provisional application No. 62/145,441, filed on Apr. 9, 2015, provisional application No. 62/180,423, filed on Jun. 16, 2015.

(51) Int. Cl.
*F04D 15/02* (2006.01)
*F04D 29/10* (2006.01)

(52) U.S. Cl.
CPC ..... *F04D 15/0263* (2013.01); *F04D 15/0218* (2013.01); *F04D 29/106* (2013.01)

(58) Field of Classification Search
CPC .... F04D 27/008; F04D 13/0693; F04D 29/18; F04D 29/106; F04D 15/0263; F04D 15/0218
See application file for complete search history.

(56) References Cited

U.S. PATENT DOCUMENTS

| 3,708,245 | A | | 1/1973 | King | |
|---|---|---|---|---|---|
| 3,721,122 | A | | 3/1973 | Lucas | |
| 3,746,472 | A | * | 7/1973 | Rupp | F04D 15/0263 277/320 |
| 4,840,535 | A | * | 6/1989 | Skarstad | F04D 13/08 415/168.2 |
| 5,173,019 | A | * | 12/1992 | Sdano | F04D 15/0263 415/118 |

(Continued)

FOREIGN PATENT DOCUMENTS

| AU | 2509088 | 5/1989 |
|---|---|---|
| CN | 201284748 | 8/2009 |

(Continued)

OTHER PUBLICATIONS

Raw Machine Traslation of KR20120033037, Kim Joong Hoon, South Korea, Mar. 2012.*

(Continued)

*Primary Examiner* — Charles G Freay
*Assistant Examiner* — Lilya Pekarskaya
(74) *Attorney, Agent, or Firm* — Cionca IP Law P.C.; Marin Cionca

(57) ABSTRACT

Modules for protecting pumps are provided having a sensor detecting leaks of the pump seal, a sensor detecting rain and/or a sensor detecting that the pump is running dry and thus is overheated. Each sensor communicates with a circuitry configured to shut down the pump until the problem is resolved and to send a notice or alarm to a person or a system. A reset button may be provided to override the shutdown of the pump by the circuitry. Methods of using the modules are also provided.

12 Claims, 19 Drawing Sheets

(56) References Cited

U.S. PATENT DOCUMENTS

| | | | | |
|---|---|---|---|---|
| 5,263,825 | A | * | 11/1993 | Doolin ................. F04D 29/108 417/423.1 |
| 5,447,078 | A | * | 9/1995 | Robinson, Jr. ........ F16H 57/029 310/83 |
| 5,449,274 | A | * | 9/1995 | Kochan, Jr. .......... F04D 15/0218 417/12 |
| 5,823,541 | A | | 10/1998 | Dietle et al. |
| 6,348,657 | B1 | * | 2/2002 | Haslock .................... F16L 5/10 16/2.1 |
| 6,364,620 | B1 | * | 4/2002 | Fletcher ............. F04D 15/0218 340/854.8 |
| 6,570,109 | B2 | | 5/2003 | Klinefelter et al. |
| 6,837,688 | B2 | | 1/2005 | Kimberlin et al. |
| 7,264,449 | B1 | * | 9/2007 | Harned ............... F04D 15/0218 417/36 |
| 7,931,447 | B2 | | 4/2011 | Levin et al. |
| 8,529,228 | B1 | * | 9/2013 | Thompson .......... F04D 15/0218 417/40 |
| 8,561,633 | B2 | | 10/2013 | Early et al. |
| 8,610,309 | B2 | | 12/2013 | Kragelund |
| 8,641,385 | B2 | | 2/2014 | Koehl |
| 8,760,302 | B1 | | 6/2014 | MacDonald |
| 2003/0079974 | A1 | | 5/2003 | Klinefelter et al. |
| 2003/0184018 | A1 | | 10/2003 | Upton et al. |
| 2003/0190243 | A1 | * | 10/2003 | Eddy ................. H01R 13/5219 417/423.3 |
| 2010/0150715 | A1 | | 6/2010 | Howard et al. |
| 2010/0302047 | A1 | | 12/2010 | Wood |
| 2010/0312398 | A1 | | 12/2010 | Kidd |
| 2011/0181431 | A1 | | 7/2011 | Koehl |
| 2011/0286859 | A1 | * | 11/2011 | Ortiz ..................... F04B 49/002 417/20 |

FOREIGN PATENT DOCUMENTS

| | | |
|---|---|---|
| CN | 103671047 | 3/2014 |
| CN | 203730276 | 7/2014 |
| CN | 204082568 | 1/2015 |
| JP | 04103825 | 4/1992 |
| JP | 2013060828 | 4/2013 |
| KR | 20120022037 | 3/2012 |
| KR | 101160318 | 6/2012 |

OTHER PUBLICATIONS

FLYGT, Mass 711-Monitoring system for pumps, Aug. 19, 2005, Charlotte, NC.
FLYGT, Flygt Leakage Sensors, Mar. 2009, Charlotte, NC.
Xylem, Inc., Flygt N-Pump Series Self-cleaning Pumps With Sustained High Efficiency, Mar. 2012, Charlotte, NC.
PRIMEX, Pump Monitor Relay Over Temperature/seal Leakage, Sep. 2014, USA.
Dickow Pumpen KG, Guidelines for Installation and Monitoring of Centrifugal Pumps and Side Channel Pumps, 2011, Waldkraiburg, Germany.
Dynaquip Controls, Zwcfs100 Wireless Water & Freeze/ Temperature Sensor: User Manual, Sep. 2, 2014, St. Clair, MO.
Kristas, James J., Global Patent Solutions Search Report, Apr. 26, 2017, Scottsdale, AZ.

\* cited by examiner

APPARATUS, SYSTEMS AND METHODS FOR PROTECTING PUMPS

CROSS-REFERENCE TO RELATED APPLICATIONS

This application claims the benefit of U.S. Provisional Application No. 62/145,441, filed Apr. 9, 2015, and U.S. Provisional Application No. 62/180,423 filed Jun. 16, 2015, which are hereby incorporated by reference, to the extent that they are not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates generally to apparatuses, systems, and methods for prolonging the life of pumps and pump motors and more particularly to apparatuses, systems, and methods for prolonging the life of pumps and pump motors by preventing damage incurred by moisture, water or other liquids, or the pump running dry.

2. Description of the Related Art

When the seal of a pump (e.g., pool or spa pump) wears out and/or becomes damaged, it starts to leak. Water from the pump, typically from the area of the impeller, then reaches the shaft housing and/or the motor shaft. Because of the water's presence onto the shaft and/or into the shaft housing, in time, the motor bearing fails, thus causing the motor to seize up. When the motor bearing begins to fail, the motor load increases, causing the motor windings to overheat and burn the insulation, thus destroying the motor. Hence, if a pump seal leak is not repaired in a timely manner, it will cause early motor failure. This can be very costly for the owner. The problem is compounded by the fact that seal leaks occur inside the shaft housing and thus are typically undetectable by simple visual inspections of the pumps.

When it rains, especially when it rains hard, rain water can somehow reach inside the motor of a pool or spa pump, through ventilation holes in the case of the motor, even though they are typically placed to face the ground, causing the motor to be destroyed. This also can be very expensive for the owner who needs to incur the cost of replacing the pump.

Additionally, when a pump (e.g. pool or spa pump) lacks a new influx or flow of water and runs dry, the pump overheats and cavitates, causing the water or vapor in the pump, pump strainer, and adjacent plumbing to rise in temperature. Without sufficient water flow due to low water levels, clogs in the system, plumbing leaks, or any other such problem, this overheating of the pump's internal components is the first symptom of cavitation and can turn residual water inside into steam. A pump running dry over a sustained period of time can lead to internal and external pump damage and pump or motor failure. The repair or replacement for the pump or motor can be very costly for the owner.

Therefore, there is a need for new systems and methods for solving the above problems.

The problems and the associated solutions presented in this section could be or could have been pursued, but they are not necessarily approaches that have been previously conceived or pursued. Therefore, unless otherwise indicated, it should not be assumed that any of the approaches presented in this section qualify as prior art merely by virtue of their presence in this section of the application.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment, a seal leak detection module is provided, which includes a switch or other types of water detection sensors placed in a tank positioned below the pump motor's shaft and seal. The switch or other water detection sensor is able to send a signal to a circuitry that can shut down the motor and send an alarm or notice to the user or owner when a seal leak is detected. An advantage may be that damage to the motor or any other parts of the pump may be prevented by early detection of a leak.

In another exemplary embodiment a rain sensor is provided, which can actuate a circuitry configured to turn off the pump's motor until the sensor is dry and to send an alarm or notice to the user or owner. An advantage may be that damage may be prevented by shortage of electronics or any other problems caused by water.

In another exemplary embodiment, a run-dry sensor is provided in the form of a thermal switch, which can actuate a circuitry configured to turn off the pump's motor between 125 and 135 Fahrenheit degrees (° F.). The thermal switch component can be any similarly functioning components, such as a thermistor, RTD-Resistance Temperature Detector, or thermocouple. An advantage may be that damage to the pump may be prevented by early detection of running dry.

In another exemplary embodiment, a rain sensor, seal leak sensor, and a run-dry sensor are used together in a pump-motor assembly. An advantage is that the sensors may address several common reasons why pool and spa pump motors fail by catching the problems early on.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which.

DETAILED DESCRIPTION OF THE PREFERRED EMBODIMENTS

Figure 1A:
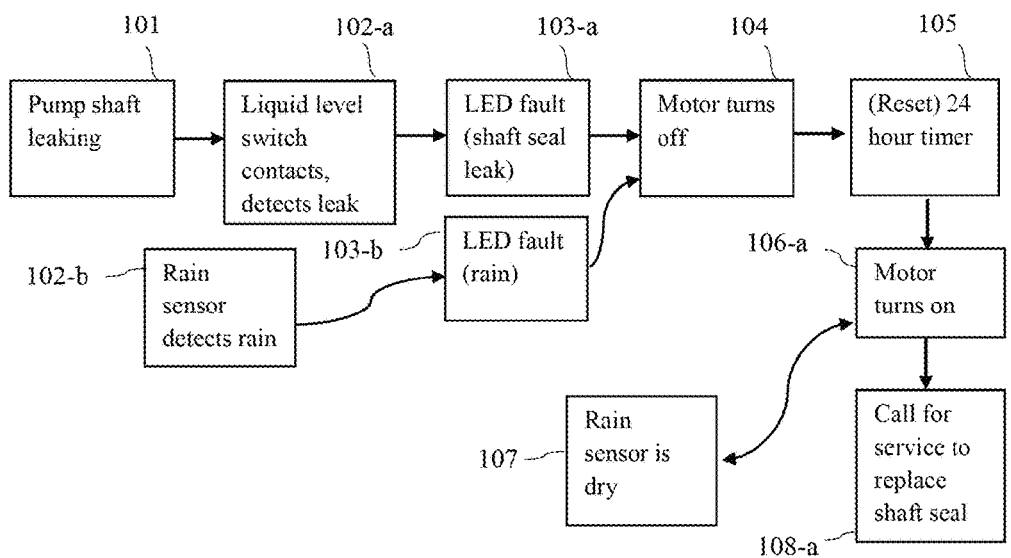
FIG. 1a is a flow chart illustrating a simplified example of a process for protecting pump motors against seal leaks and rain, according to an embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled structures across the figures (e.g., 209 and 409, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1a is a flow chart illustrating a simplified example of a process for protecting pump motors against seal leaks and rain, according to an embodiment. As shown, when a pump shaft seal is leaking (step 101), the leakage may be detected by providing a liquid level switch or a water detection sensor (step 102), as it will be described hereinafter when referring to FIGS. 4a-6e. At detection, an alarm, such as a visual alarm provided by an LED that is turned on (step 103-a) may be provided to notify the user (e.g., home owner) that there is a leak at the shaft's seal. Further, at detection of the leak, the pump motor is preferably turned off (step 104) to prevent damage of the shaft's bearing and ultimately destruction of the motor.

The user may be provided with the option to override (step 105) the shutting down of the motor for a predetermined period of time such as 24 hours, which will cause the motor to stay on (step 106-a) for that period of time, absent other contrary commands from other circuitry controlling the motor. This option may be useful to the user in various circumstances (e.g., the user such as a homeowner is in the middle of a pool party, and thus needs the pool equipment to keep running) The alert (e.g., a labeled LED) will preferably stay on until the user calls for service to replace the shaft seal (step 108).

Similarly, a rain sensor may be provided (step 102-b), as will be described hereinafter when referring to FIGS. 7a-d to detect rain, and preferably cause the pump motor to be turned off (step 104) and an alarm (step 103-b) such as a visual alarm (e.g., a labeled LED) to go off to notify the user as to why the pump was shut down. A reset/override option (step 105) may be provided to the user in this instance as well, such as, for instance, if the motor was inadvertently wet while hosing the area or if the pool needs to be cleaned. After the rain stops and the rain sensor becomes dry (step 107), the system is preferably configured to allow the motor to turn on again and resume its normal program (step 106-a) after a preset period of time, such as, for example, 24 hours. An advantage may be that the electronics may be fully dried before powering back on, which may lower the risk of damage to the electronics.

Figure 1B:
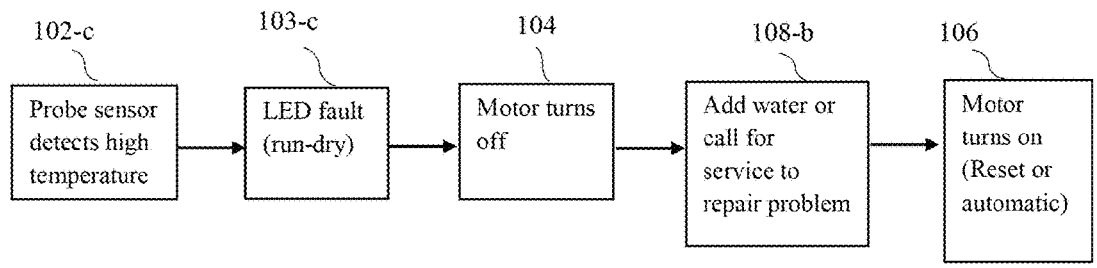
FIG. 1b is a flow chart illustrating a simplified example of a process for protecting pump motors against damage incurred from running dry, according to an embodiment.

FIG. 1b is a flow chart illustrating a simplified example of a process for protecting pump motors against damage incurred from running dry, according to an embodiment. Because a pump runs dry, the temperature inside the pumps strainer increases for the duration it runs dry, i.e., without a new water source. A run-dry sensor may be provided (step 102-c), as will be described hereinafter when referring to FIGS. 8a-c to detect when the temperature inside the pump strainer area is between 125-135 degrees Fahrenheit. Once a high limit sensor or thermistor or any other similar high temperature detector indicates that the water's temperature has reached the overheating range, an alarm/notice may be provided, such as, for example, an LED turning on (step 103-c) to alert the user. Further, at detection of the pump running dry, the pump's motor is preferably turned off (step 104) and locked to prevent damage to the motor, impeller, diffuser, and other parts, until the user has rectified the problem by adding water, repairing the underlying issue, or calling for service (step 108-b) without an option for a manual override as long as the high temperature is detected. An advantage may be that damage from the running dry may be prevented. Once the problem has been rectified, the motor may turn back on either by a manual reset by the user or automatically after a normal temperature has been detected (step 106-b). The system may be configured to also turn off the motor after a set period of time of running dry without constant water flow, such as, for example, approximately 20 minutes.

Figure 2:
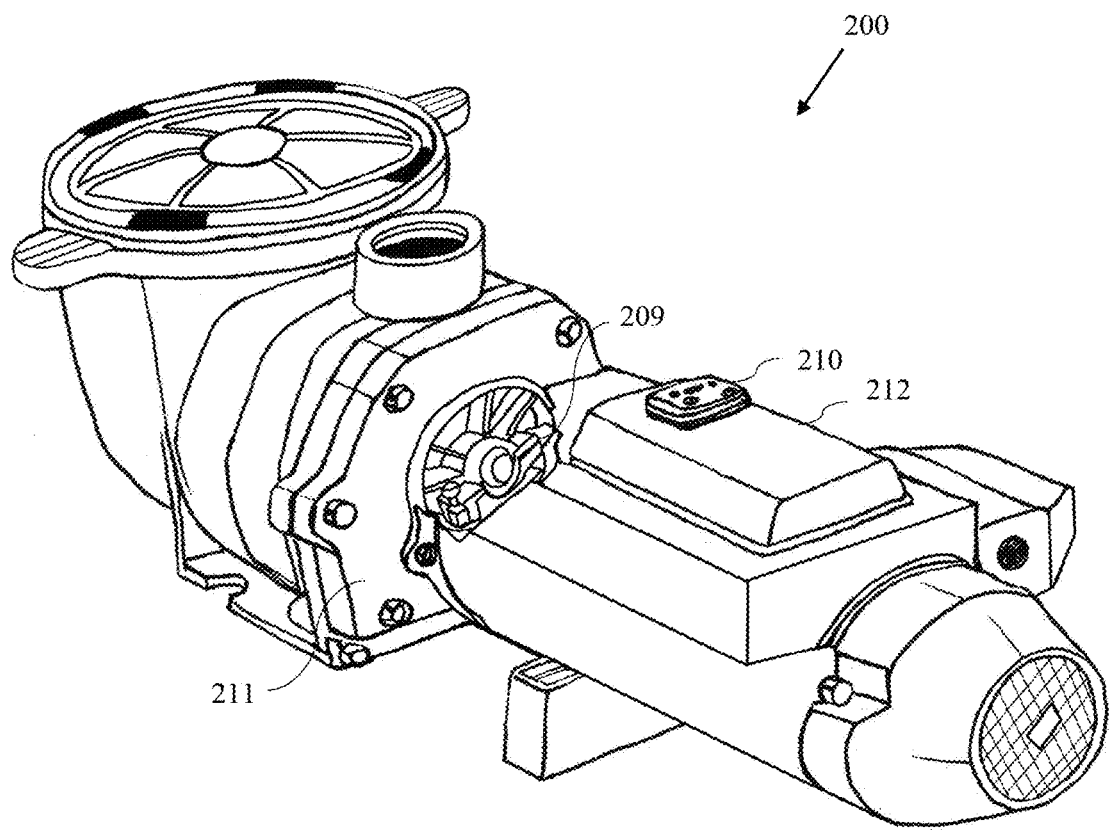
FIG. 2 illustrates a perspective view of a pump-motor assembly with the back plate open and a control panel interface for sensors integrated with the assembly, according to an embodiment.
Figure 3A:
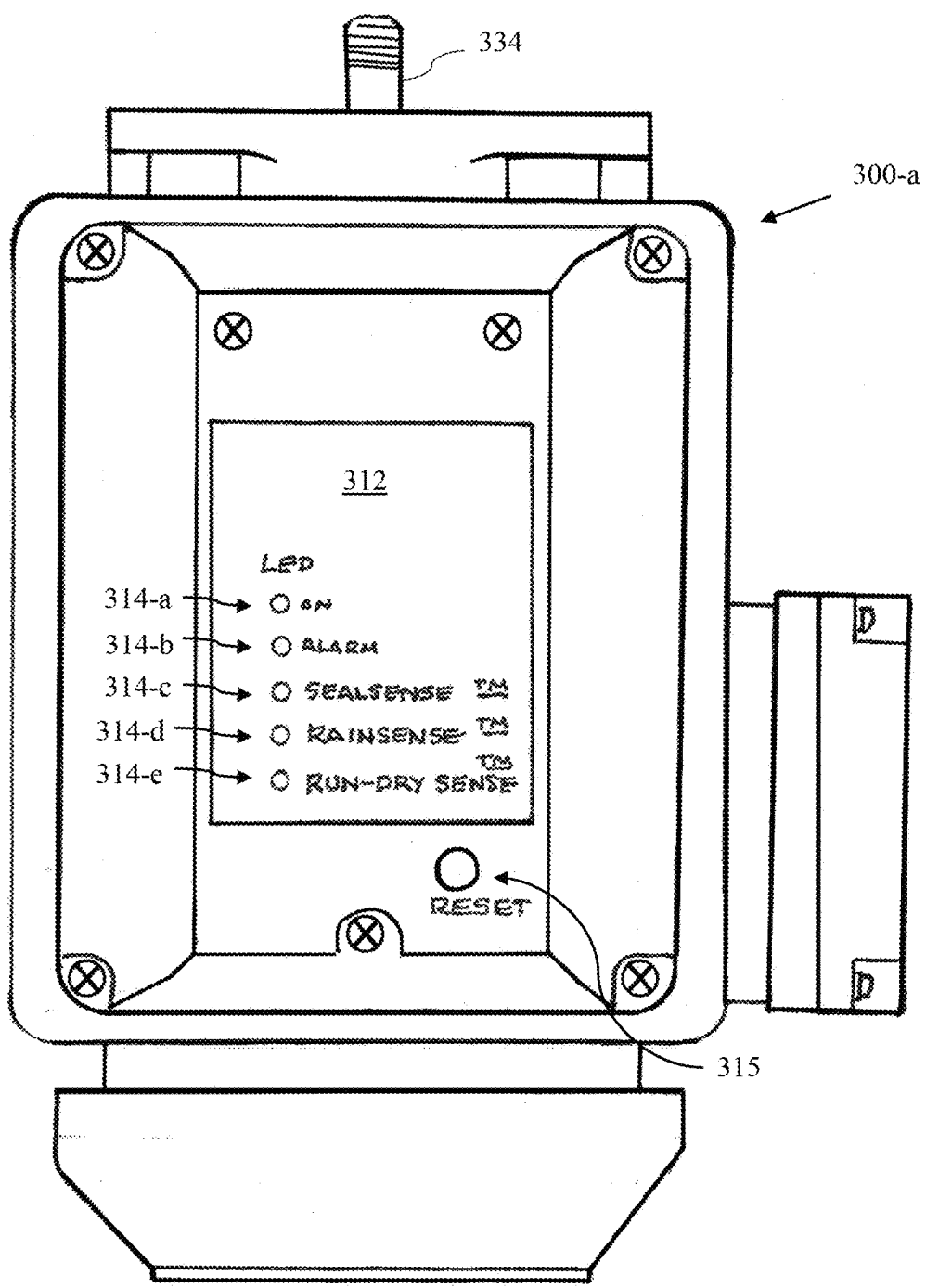
FIG. 3a illustrates a top view of a pump motor with a control panel interface, according to an embodiment.
Figure 3B:
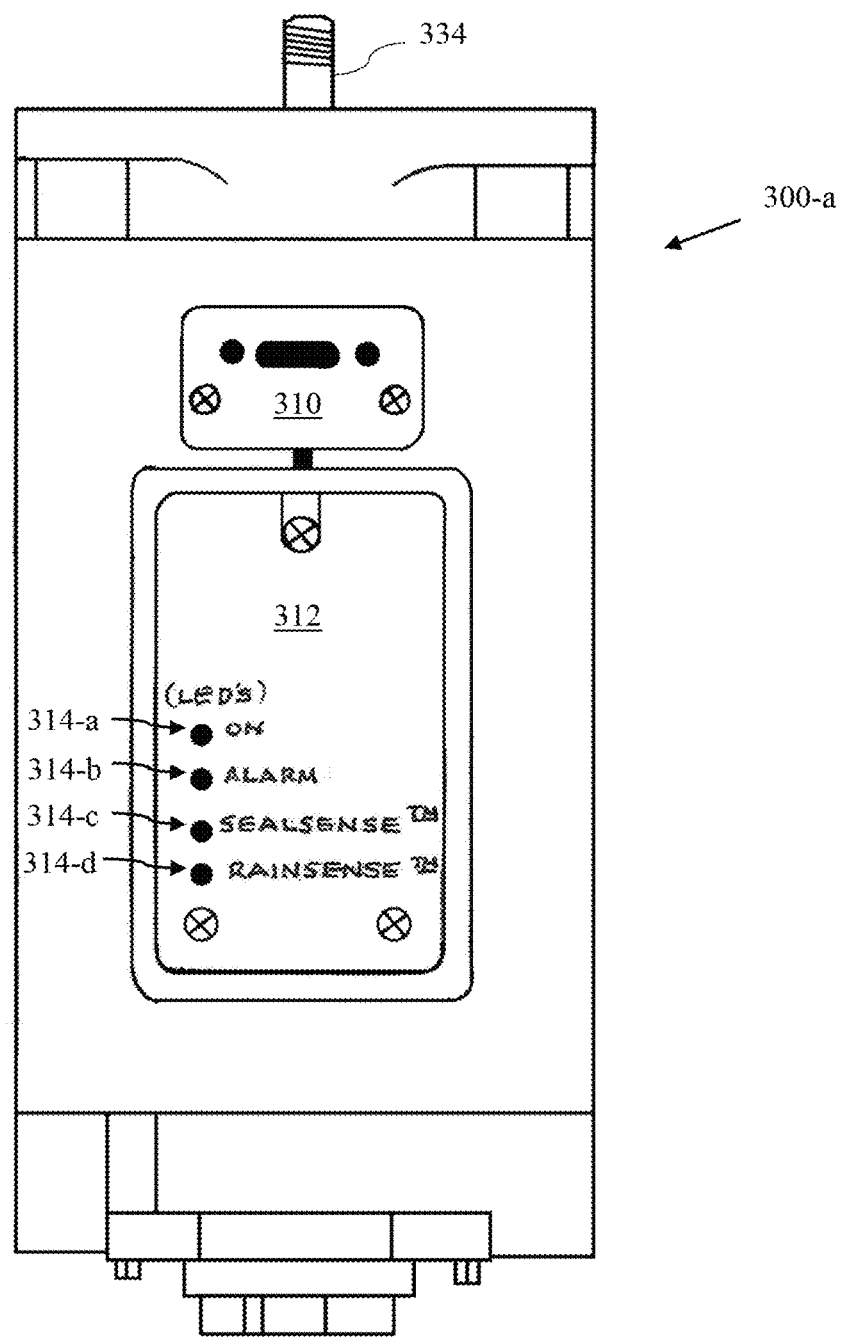
FIG. 3b illustrates a top view of a pump motor with a control panel interface and a rain sensor mount, according to an embodiment.
Figure 8A:
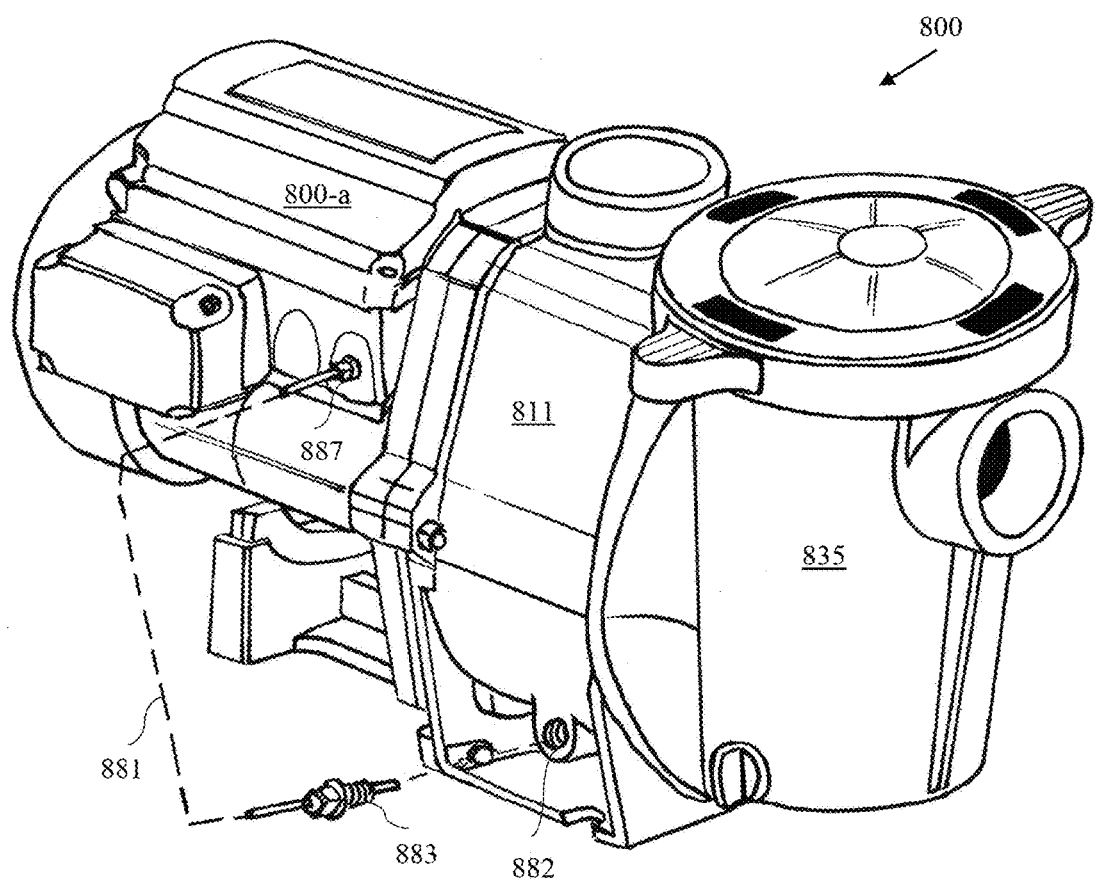
FIG. 8a illustrates a perspective view of a pump-motor assembly with a run-dry sensor, according to an embodiment.

FIG. 2 illustrates a perspective view of a pump-motor assembly 200 with the back plate 211 open and a control panel interface 212 for sensors integrated with the assembly 200, according to an embodiment. The pump-motor assembly 200 may include a rain sensor 210, seal leak sensor 209, and/or a run-dry sensor (as shown in FIG. 8a). The sensors may be used with any suitable type of motor, such as, for example, a variable speed motor or a single speed motor. The interface 212 may include visual alarms such as LEDs, buttons such as on, off, or reset buttons, and other such similar controls and visual indicators for their respective sensors (as shown in FIGS. 3a-b). The interface 212 may also include controls for audible alerts.

Again, a rain sensor 210 may help to protect a pump and motor from shorting by turning the motor off and back on to its normal program the following day after the rain has stopped, and a seal leak sensor 209 may help to prevent damage to the motor by detecting leaks in the motor shaft seal and turning off the motor until repairs have been made. The rain sensor 210 may be mounted onto a pump-motor assembly 200 such as, for example, on the interface 212 as shown, or may be provided with a pump and motor pre-assembled. The mount may be a universal mount. An advantage may be that various types of pumps and motors may be used with the rain sensor 210 mount. The seal leak sensor 209 may be molded to the back plate 211.

FIG. 3a illustrates a top view of a pump motor 300-a with a control panel interface 312, according to an embodiment. The motor 300-a may connect to the pump (as shown in FIG. 2) by a motor shaft 334. The control panel interface 312 may include an LED 314-a to serve as a visual indicator that the sensors are on, an LED 314-b to serve as a visual indicator for an alarm such as an audible alarm or any other suitable system, and LEDs 314a-e to serve as visual alarms indicating a particular fault within the pump-motor assembly 200. A seal leak sensor represented by the alarm LED 314-c, a rain sensor represented by the alarm LED 314-d, or a run-dry sensor represented by the alarm LED 314-e, or any combination thereof, may be used for prolonging the life of the pump. All three sensors are preferably used together to provide the strongest protection for the pump-motor assembly 200. The sensors may be integrated into an existing pump such as a variable speed pump, or each may be retrofitted as a standalone device in any combination or all three together to utilize a three-sensor protection system, which will considerably increase pump's and motor's life. A reset or override button 315 may be provided. The reset or override button 315 is preferably used for the seal leak sensor 209 and rain sensor 210.

FIG. 3b illustrates a top view of a pump motor 300-a with a control panel interface 312 and a rain sensor mount 310, according to an embodiment. The motor 300-a may connect to the pump (as shown in FIG. 2) by a motor shaft 334. Again, the control panel interface 312 may include an LED 314-a to serve as a visual indicator that the sensors are on, an LED 314-b to serve as a visual indicator for an alarm such as an audible alarm or any other suitable system, and LEDs 314a-d to serve as visual alarms indicating a particular fault within the pump-motor assembly 200, or any other visual indicators.

Figure 4A:
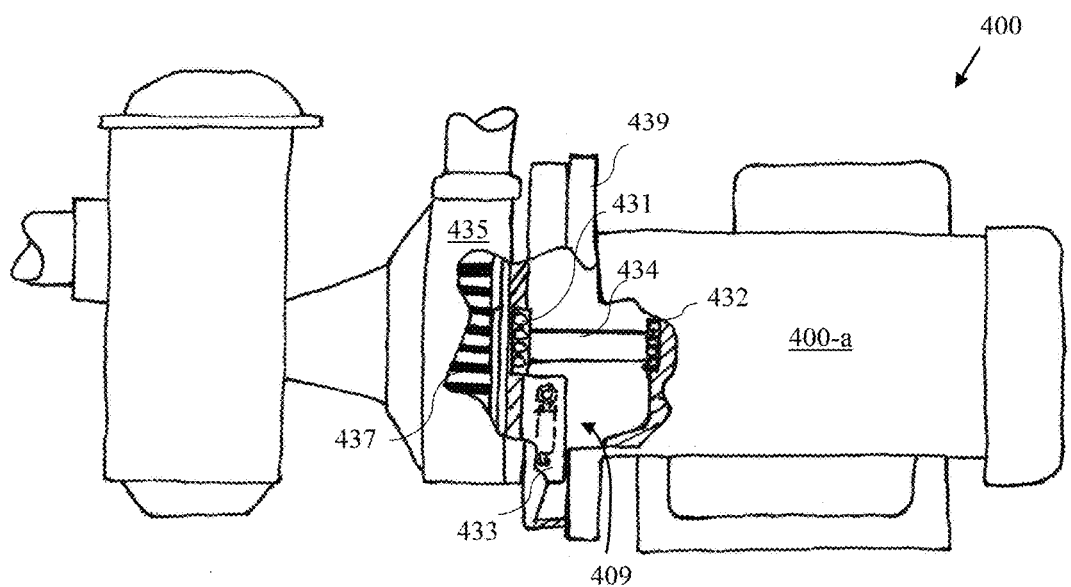
FIG. 4a illustrates schematically a side view of a pump-motor assembly with a cutaway showing that the pump-motor assembly has a collector tank or manifold for a seal leak sensor, according to an embodiment.
Figure 4B:
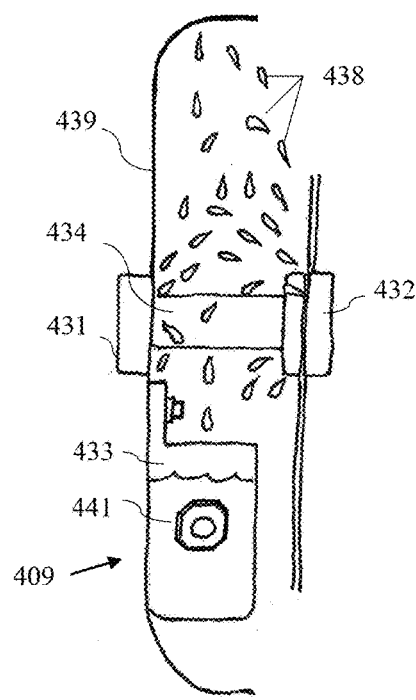
FIG. 4b illustrates schematically an enlarged cross-sectional view of the shaft area from FIG. 4a, showing the seal leak sensor.
Figure 4C:
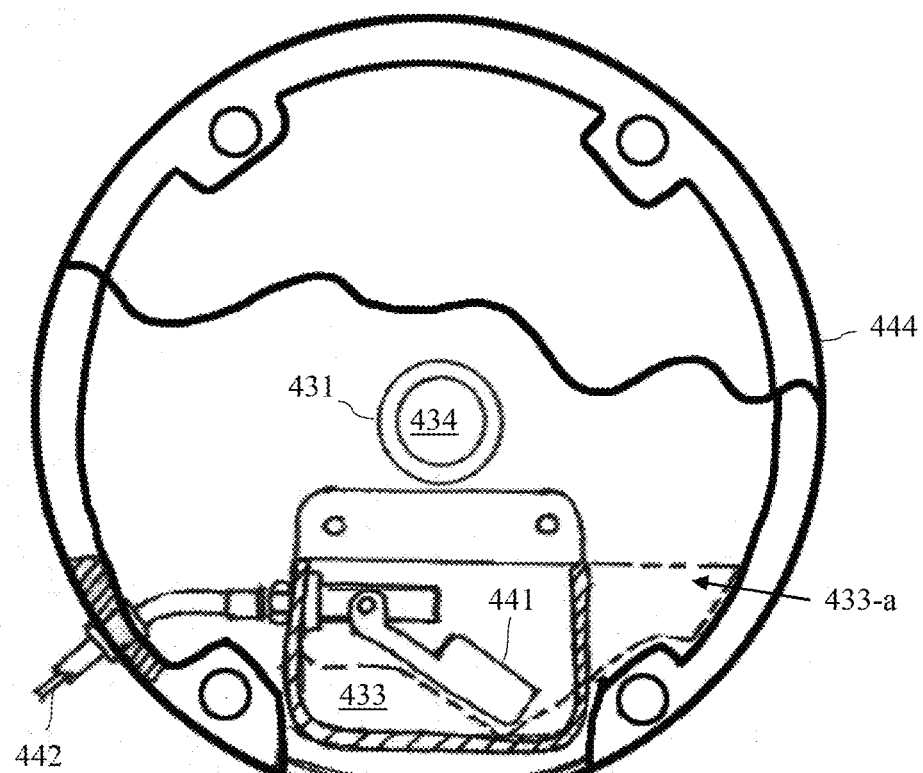
FIG. 4c illustrates schematically a longitudinal-sectional view of the shaft area from FIG. 4a, showing the seal leak sensor inside of the pump case.
Figure 4D:
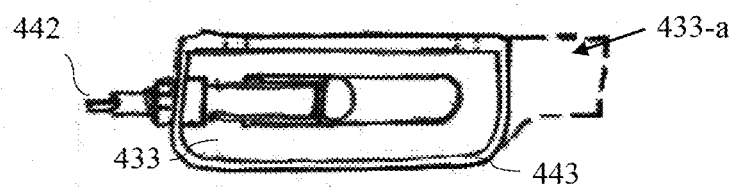
FIG. 4d illustrates a top view of the open tank shown in FIG. 4c.

FIG. 4a illustrates schematically a side view of a pump-motor assembly 400 with a cutaway showing that the pump-motor assembly 400 has a collector tank or manifold 433 for a seal leak sensor 409, according to an embodiment. FIG. 4b illustrates schematically an enlarged cross-sectional view of the shaft area from FIG. 4a, showing the seal leak sensor 409. FIG. 4c illustrates schematically a longitudinal-sectional view of the shaft area from FIG. 4a, showing the seal leak sensor 409 inside of the pump case 444. FIG. 4d illustrates a top view of the open tank 433 shown in FIG. 4c.

As shown, when the pump seal 431 becomes worn out and/or damaged, it starts to leak water from the pump 435, typically from the area of the impeller 437, and the water reaches the shaft housing 439 and/or motor shaft 434, such as, for example, in the form of water spray 438, and/or by, for example, flowing onto or moisturizing the outer surface of shaft 434, or by a combination thereof. Because of the water's presence onto the shaft 434 and/or into the shaft housing 439, in time the motor bearing 432 fails, thus causing the motor 400-a to seize up. When the motor bearing 432 begins to fail, the motor load increases, causing the motor windings to overheat and burn the insulation, thus destroying the motor 400-a. Hence, if a pump seal leak is not repaired in a timely manner, it will cause early motor failure.

The seal leak sensor 409 may include as shown a switch or water sensor 441 and a water collector 433, such as a tank. It should be noted that the water entering the shaft housing 439, eventually, because of gravity, will fall downwards to the bottom of the shaft housing 439. Thus, as shown, a tank 433 may be placed below the seal 431 and/or shaft 434 to collect that water. Further, a switch 441 may be placed inside the tank 433, such that when, for example, water enters and/or starts to accumulate into the tank 433, the switch 441 turns on and preferably triggers an alarm and/or a shutdown of the motor 400-a (as described when referring to FIGS. 4c-d) through, for example, wire(s) 442 or wirelessly by, for example, sending a signal to a circuitry, such as the sample circuitry shown in FIG. 9a, which generates the alarm/notice and/or shuts down the motor 400-a. Other types of water sensors may be used at 441.

It should be understood that in order for the water to enter the tank 433 and trigger the switch 441 or a water detection sensor, various options for the top of the tank 433 may be employed, such as open top 443, perforated top (not shown), and so on.

It should be noted in FIG. 4c that a custom-molded tank 433-a may be used, which fits snugly to the inner surface of preferably the pump's case 444. Further, the custom tank 433-a may be integrated into the pump's (or motor's) case 444 during manufacturing, such as by modifying the mold for the pump (or motor) to include the custom tank 433-a.

Figure 5A:
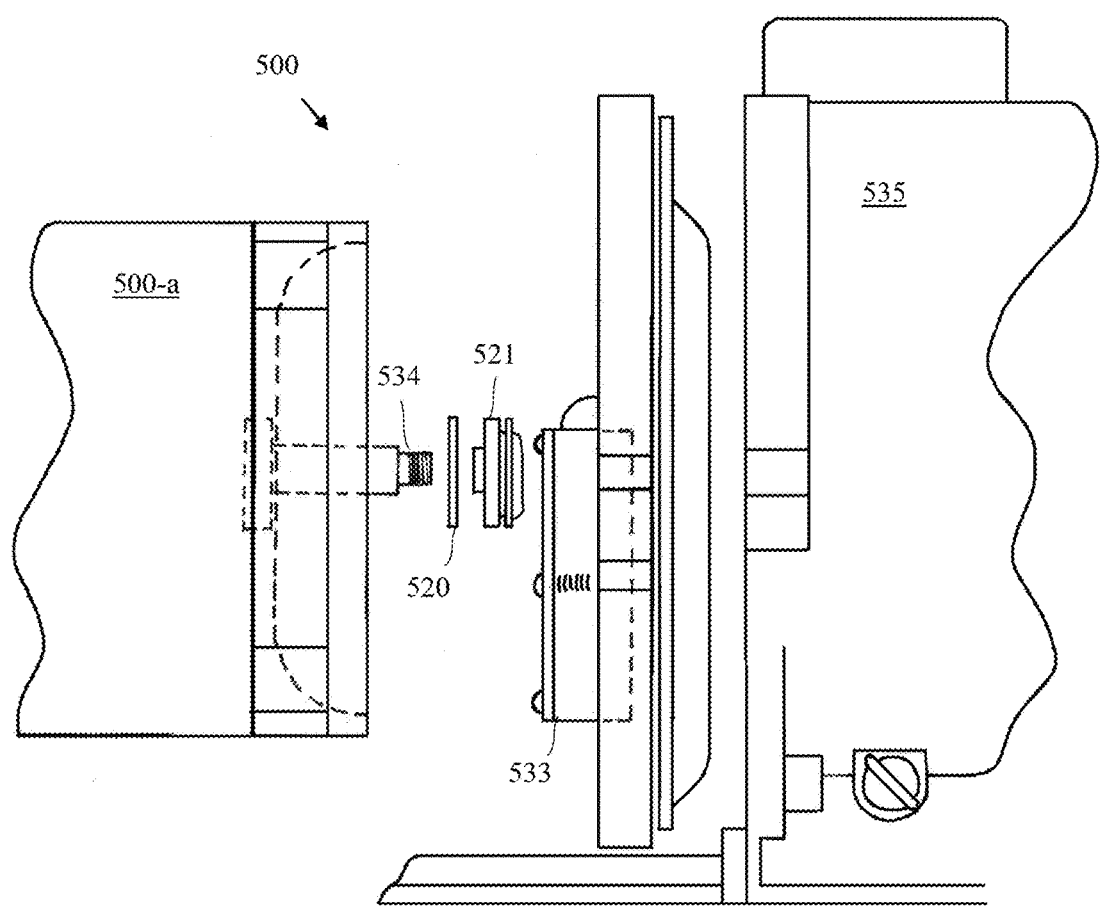
FIG. 5a illustrates an exploded side view of a seal leak sensor used in combination with a sealing grommet in a pump-motor assembly, according to an embodiment.

FIG. 5a illustrates an exploded side view of a seal leak sensor as represented by the water collector 533 used in combination with a sealing grommet 521, which can be fitted sealably onto the shaft 534, in a pump-motor assembly 500, according to an embodiment. The grommet 521 may be used with a motor bearing washer 520 for securely placing onto the motor shaft 534. The sole purpose of the sealing grommet, or "shaft seal" is to divert water away from the motor shaft and bearing.

Figure 5B:
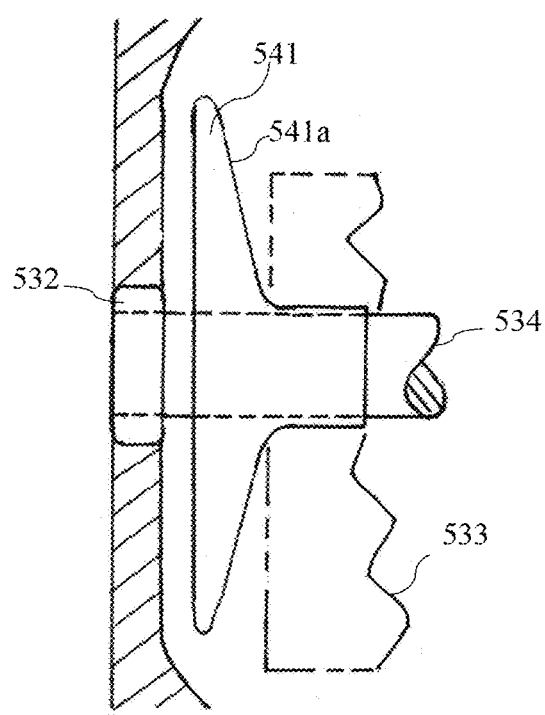
FIG. 5b illustrates an enlarged side view of another sealing grommet used in combination with a seal leak sensor in a pump-motor assembly, according to an embodiment.

FIG. 5b illustrates an enlarged side view of another sealing grommet 541 used in combination with a seal leak sensor in a pump-motor assembly, according to an embodiment. As shown, the sealing grommet is sealably fitted onto the shaft 534 in a portion surrounded by the collector 533, when such a collector is used (see for example FIG. 6a).

As discussed earlier when referring to FIGS. 4a-b, when the pump seal 431 becomes worn out and/or damaged, the water reaches the shaft housing 439 and/or motor shaft 434, such as, for example, in the form of water spray 438, and/or by, for example, flowing onto or moisturizing the outer surface of shaft 434, or by a combination thereof. The grommets 521/541 may be hydrophobic to act as a water seal, and may be constructed of rubber, silicone, vinyl, or any other suitable material. They can deflect and prevent water from the motor shaft 534 or shaft housing 439 from reaching the motor bearing 532. The advantage is that the front bearing 532 of the motor may be protected from moisture. For example, a grommet such as the one depicted at 541 in FIG. 5b, may seal as shown the joint between shaft 534 and collector 533, thus preventing the advance of water or moisture from the shaft 534 toward motor bearing 532, and also have an oversized diameter (e.g., three times the diameter of the motor bearing 532) and a slopped back face 541a to deflect water that may be sprayed inside the shaft housing 439 away from the motor bearing 532.

It should be observed that the grommets 521/541 may work independently from the seal leak sensor. Thus, they could be used alone to prevent damage to the motor bearing and thus extend the life of the motor. Further, the seal sensor may work with or without the grommets. Using the combination of grommets and seal sensor offers increased protection of the motor.

The grommets 521/541 may be flexible for snapping or pushing into place. As an example, the grommets 521/541 may be made of hard polyolefin and a have a hardness of Shore 45D. The grommets 521/541 may be constructed to withstand temperatures up to 200° F.

Figure 6A:
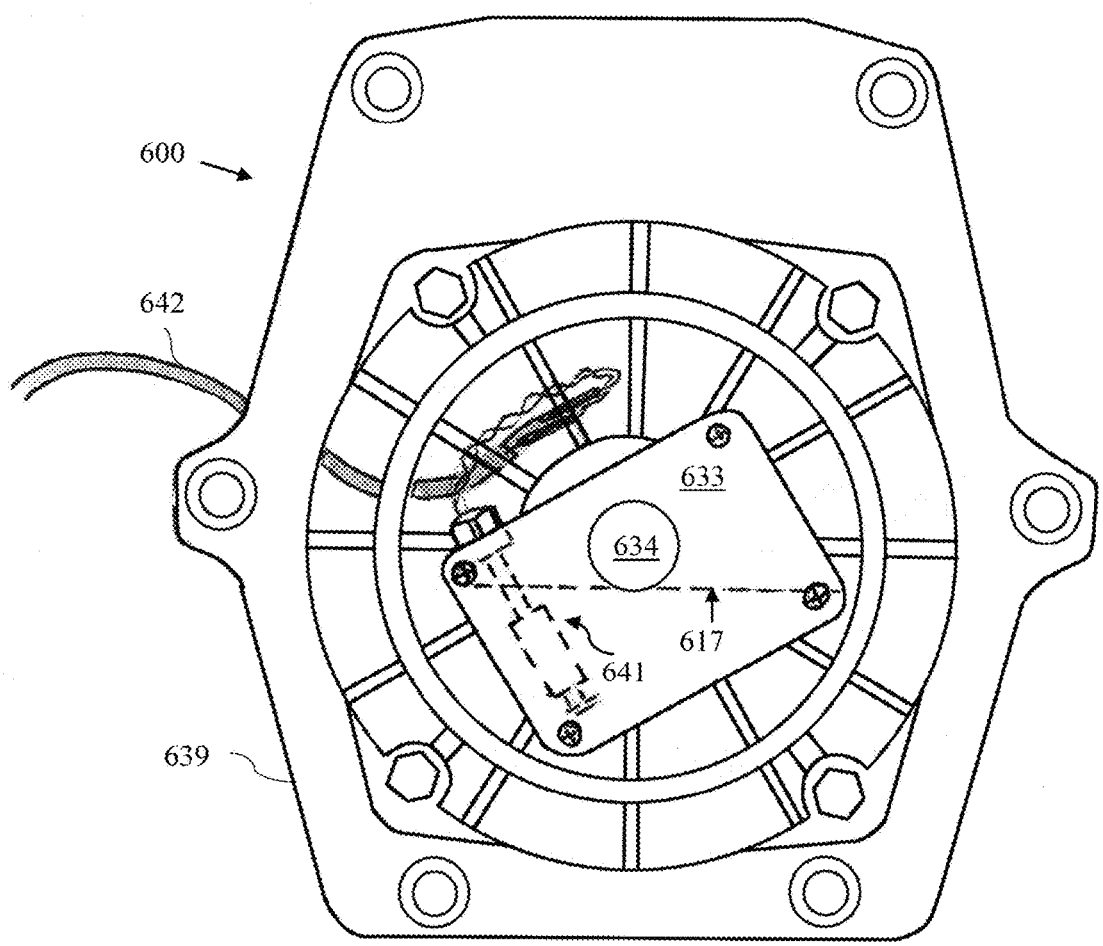
FIG. 6a illustrates a longitudinal-sectional view of the shaft area of a pump-motor assembly with a seal leak sensor having a liquid level switch and a collector manifold that provides 360 degrees of coverage around the motor shaft 634, according to an embodiment.

FIG. 6a illustrates a longitudinal-sectional view of the shaft area of a pump-motor assembly 600 with a seal leak sensor having a liquid level switch 641 and a collector manifold 633 that provides 360 degrees of coverage as shown around the motor shaft 634, according to an embodiment. An advantage of the 360 degree coverage of the shaft 634 may be that the collector manifold 633 may collect any water or water vapor traveling down the motor shaft 634 and prevent it from reaching any other part inside of the motor housing 639. The liquid level switch 641 may be in the form of a float switch or a water detection sensor and may be constructed from polypropylene, for example. The switch 641 may be raised and lowered by the water level 617 and may require a certain amount of water to be raised, for example, 4-5 tablespoons. The collector tank/manifold 633 may be mounted to the back plate (as shown by 211 in FIG. 2) or motor face, and may be set at 30 degree angle as shown in FIG. 6a (i.e., 30 degrees between the bottom of tank and horizontal). An advantage may be that the water level 617 may more easily engage the switch 641, such that the polypropylene float switch 641 may contact a reed switch, with a magnet imbedded into the float (not shown). When the switch 641 is raised by the water level 617, a signal may then be sent through wires 642 or wirelessly to a circuit (e.g., 923 in FIG. 9c) to power down the motor and for example illuminate the seal leak LED (as shown by 314-c in FIG. 3a).

Figure 6B:
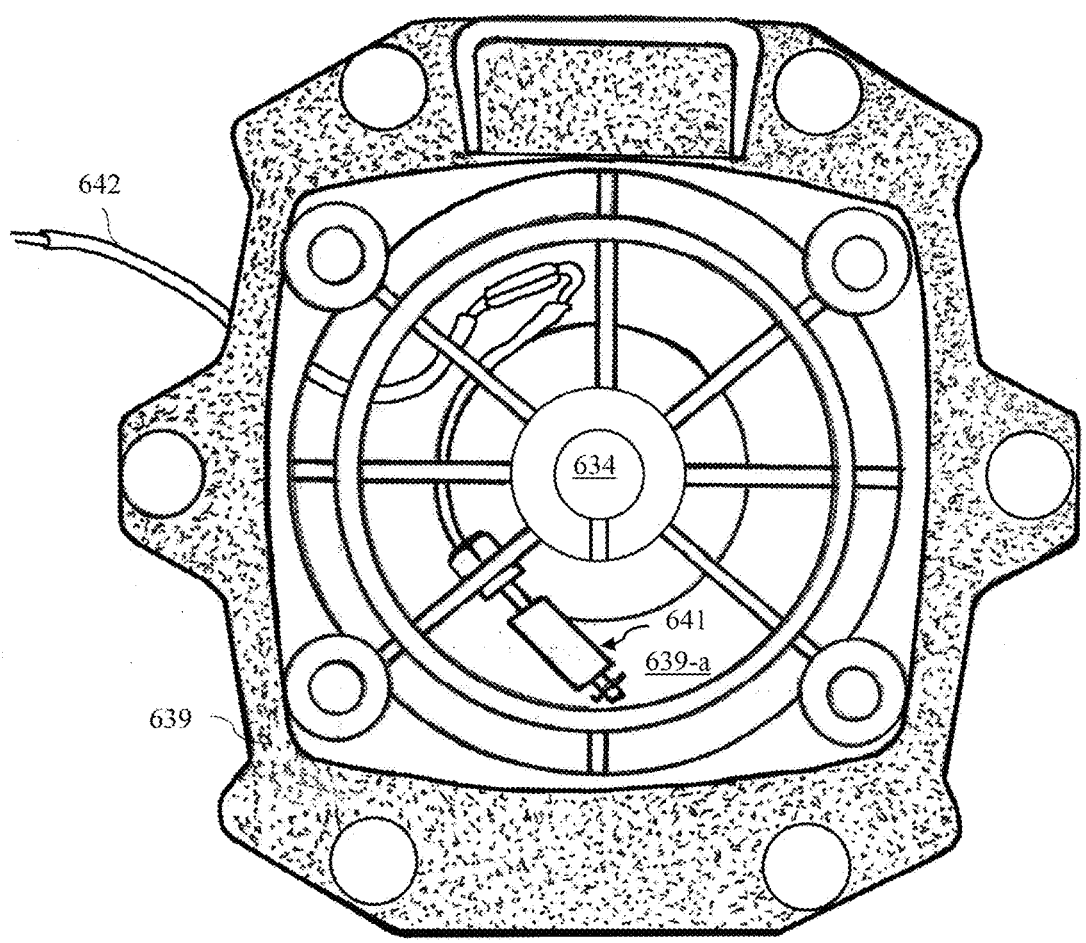
FIG. 6b illustrates a longitudinal-sectional view of the shaft area of a pump-motor assembly with a seal leak sensor having a liquid level switch without a collector manifold or cover for the liquid level switch in place, according to an embodiment.

FIG. 6b illustrates a longitudinal-sectional view of the shaft area of a pump-motor assembly 600 with a seal leak sensor having a liquid level switch 641 without a collector manifold/tank or cover for the liquid level switch 641 in place, according to an embodiment. As suggested, in an alternative embodiment, the switch 641 may also be used without a collector manifold/tank in place, such that the float switch 641 is raised by water entering the shaft housing 639 and accumulating into the bottom of the inside cavity 639-a of the shaft housing 639. Again, the switch 641 may be raised and lowered by the water level 617 and may be calibrated to require a certain amount of water to be raised, for example, 4-5 tablespoons.

Figure 6C:
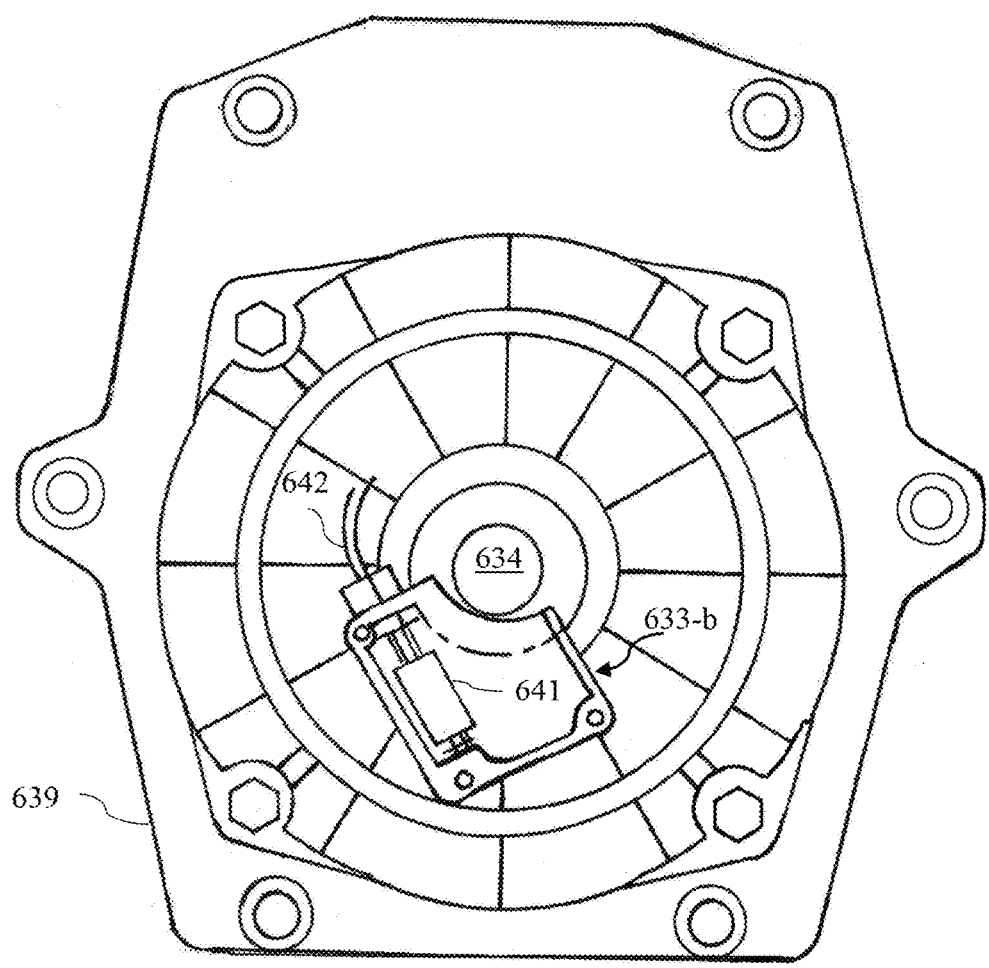
FIG. 6c illustrates a longitudinal-sectional view of the shaft area of a pump-motor assembly with a seal leak sensor having a liquid level switch and a collector manifold placed underneath the motor shaft, according to an embodiment.

FIG. 6c illustrates a longitudinal-sectional view of the shaft area of a pump-motor assembly 600 with a seal leak sensor having a liquid level switch 641 and a collector manifold/tank 633-b placed immediately underneath the motor shaft 634, according to an embodiment. An advantage may be that the collector manifold 633-b may collect any water falling from the motor shaft 634. Again, the switch 641 may be raised and lowered by the water level 617 and may require a certain amount of water to be raised, for example, 4-5 tablespoons. The collector manifold 633-b may be mounted to the back plate (as shown by 211 in FIG. 2) or motor face, and may be set at an angle, such as, for example, a 30 degree angle, as shown. Again, the angle may help in achieving a water level (as shown by 617 in FIG. 6a) in the collector manifold 633-b that may raise the switch 641.

Figure 6D:
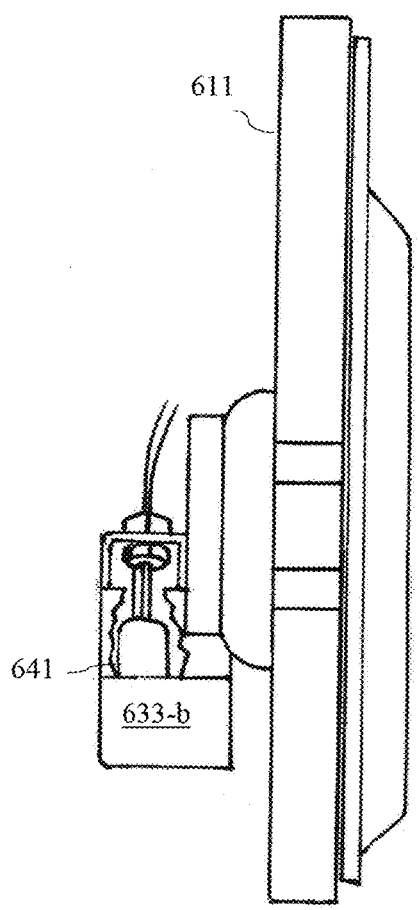
FIG. 6d illustrates a side view of a liquid level switch in a collector manifold mounted onto a seal plate, according to an embodiment.
Figure 6E:
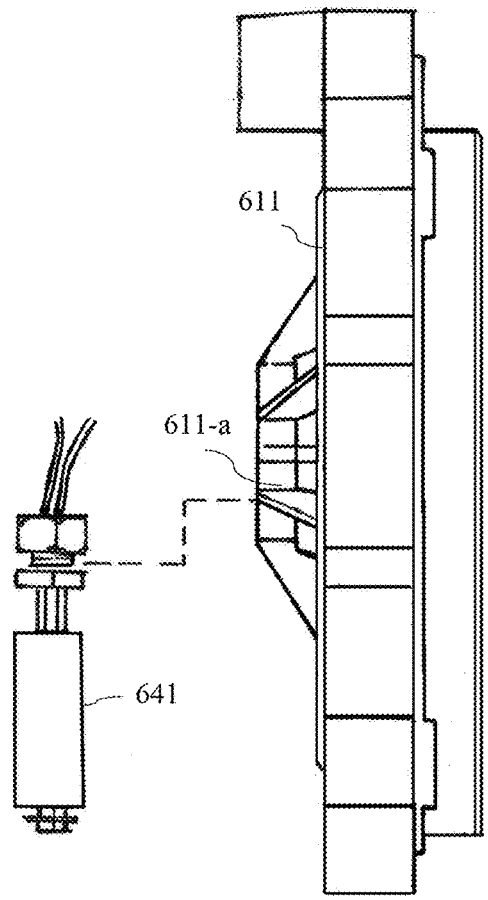
FIG. 6e illustrates an exploded side perspective view of a liquid level switch that may be fitted into a well in a seal plate.

FIG. 6d illustrates a side view of a liquid level switch 641 in a collector manifold 633-b mounted onto a seal plate 611, according to an embodiment. FIG. 6e illustrates an exploded side perspective view of a liquid level switch 641 that may be fitted into a well 611-a in a seal plate 611. An advantage of the liquid level switch 641 without the collector manifold may be that some models of pumps may not have the clearance for the manifold 633 or 633-b.

Figure 7A:
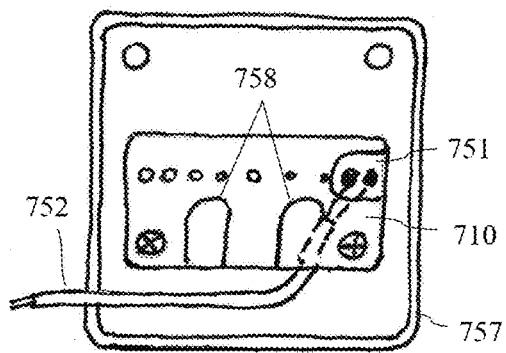
FIGS. 7a-d illustrate various views of a rain sensor mount, according to an embodiment.
Figure 7C:
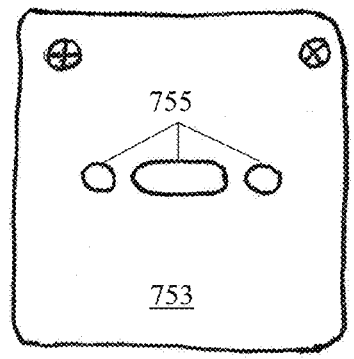
Figure 7B:
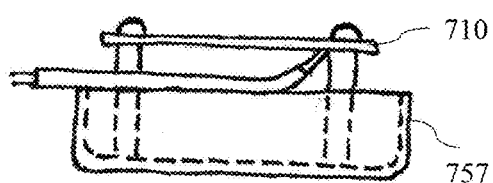
Figure 7D:
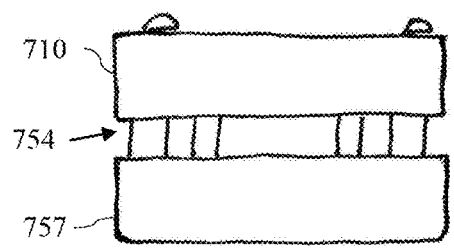

FIGS. 7a-d illustrate various views of a rain sensor mount 710, according to an embodiment. FIG. 7a is a top view (cover off), FIG. 7b is a front side view (cover off), FIG. 7c is a top view (cover on) and FIG. 7d is a front side view (cover on) of the rain sensor mount 710.

As shown at 751, the rain sensor 710 may include two spaced apart solder connections or points, which are preferably insulated with, for example, a liquid insulation tape, such that they cannot communicate electrically even when the space between them is wet. This is important because, without the insulation, it was observed that one drop of water between the two solder points 751 may trigger the alarm, which may be a false alarm and thus undesirable. Instead, as shown, it is preferable to use, facing upwards, the lower sensitivity side of the rain sensor 710, which has the two sensor areas 758 spaced apart such that a more substantial amount of water is required to close the circuit between the two sensor areas 758 and thus trigger the alarm discussed above when referring to FIG. 1. Insulating the two solder points 751 maintains the low sensitivity function of this side of the rain sensor 710, thus only triggering the alarm when rain is pouring down and water closes the circuit between the two sensor areas 758. It should be understood that the two sensor areas 758 are independently connected electrically with the two solder points and thus with the two wires 752.

Figure 9A:
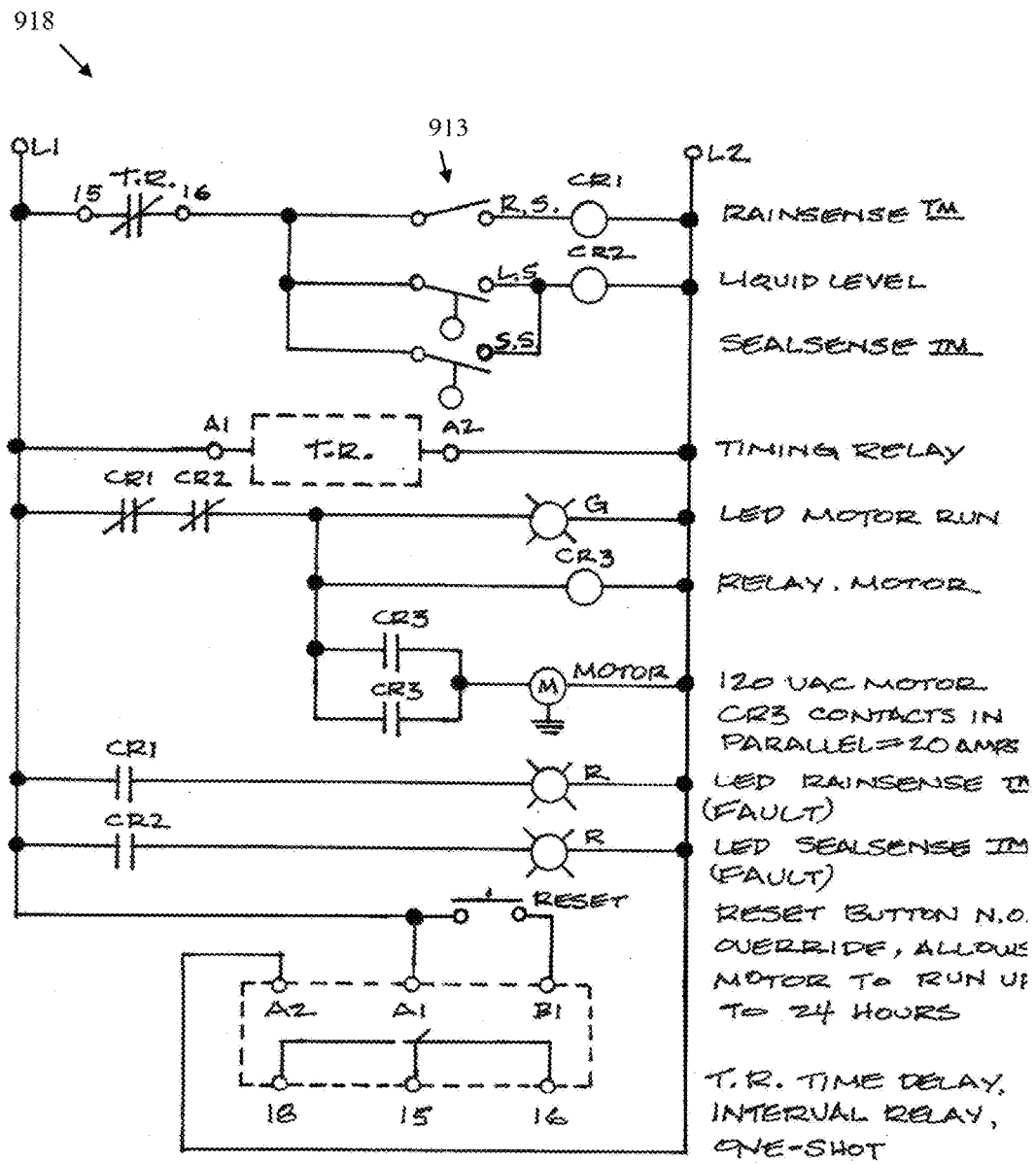
FIG. 9a is an example of control circuitry that may be used in connection with the seal leak sensor and the rain sensor and their operations, according to an embodiment.

The two wires 752 are preferably further connected to the sample control circuitry 918 shown in FIG. 9a, such that when it rains and thus water electrically connects the two sensor areas 758, the R.S. (rain sensor) circuit 913 in FIG. 9a closes and the rain sensor red LED turns on to notify the owner. As shown in FIG. 7b, the rain sensor 710 is preferably mounted above a container base 757, thus providing a standoff gap 754 to keep the sensor above the spill-over base and may allow overflow water to drain. This ensures, for example, that when the rain stops and the rain sensor 710 becomes dry, the rain alarm stops. The system may be configured such that the rain sensor LED (as shown by 314-d in FIG. 3a-b) may be illuminated throughout the time the motor is powered down. As shown, the rain sensor may be protected by a cover 753. The cover 753, as shown in FIG. 7c, may have holes 755 to permit the rain to get through and reach the two sensor areas 758.

FIG. 8a illustrates a perspective view of a pump-motor assembly 800 with a run-dry sensor 883, according to an embodiment. The run-dry sensor 883 may be used with, for example, a variable speed pump or a single speed pump. The run-dry sensor 883 may be a Normally Closed (N.C.) open on temperature rise, Normally Open (N.O.) close on temperature rise thermal switch, or other sensor types. In one exemplary embodiment a run-dry sensor 883 may be provided in the form of a thermal switch, that can actuate a circuitry configured to turn off the pump's motor 800-a when the temperature of the water or derivations thereof (e.g., moisture) in the pump's strainer area is preferably between 125 and 135 Fahrenheit degrees. As discussed when referring to FIG. 1b, it has been observed that after approximately a period of 20 minutes of running dry, without constant water flow, damage to the pump and/or motor will typically start to occur. That is prevented by the run-dry sensor system and method disclosed herein, which detects the increased temperature, preferably in the strain area, due to the pump running dry, before damage to the pump and the motor occurs due to for example overheating.

The run-dry sensor 883 may be inserted for example into the pump 835 back drain 882 using for example a ¼" NPT compression connector or thermowell and routed via wires 881 into the pump motor controls 887. It should be understood that the cable or wires from the run-dry sensor 883 to the motor controls 887 may be routed by any standard means known in the art.

Figures 8B, 8C:
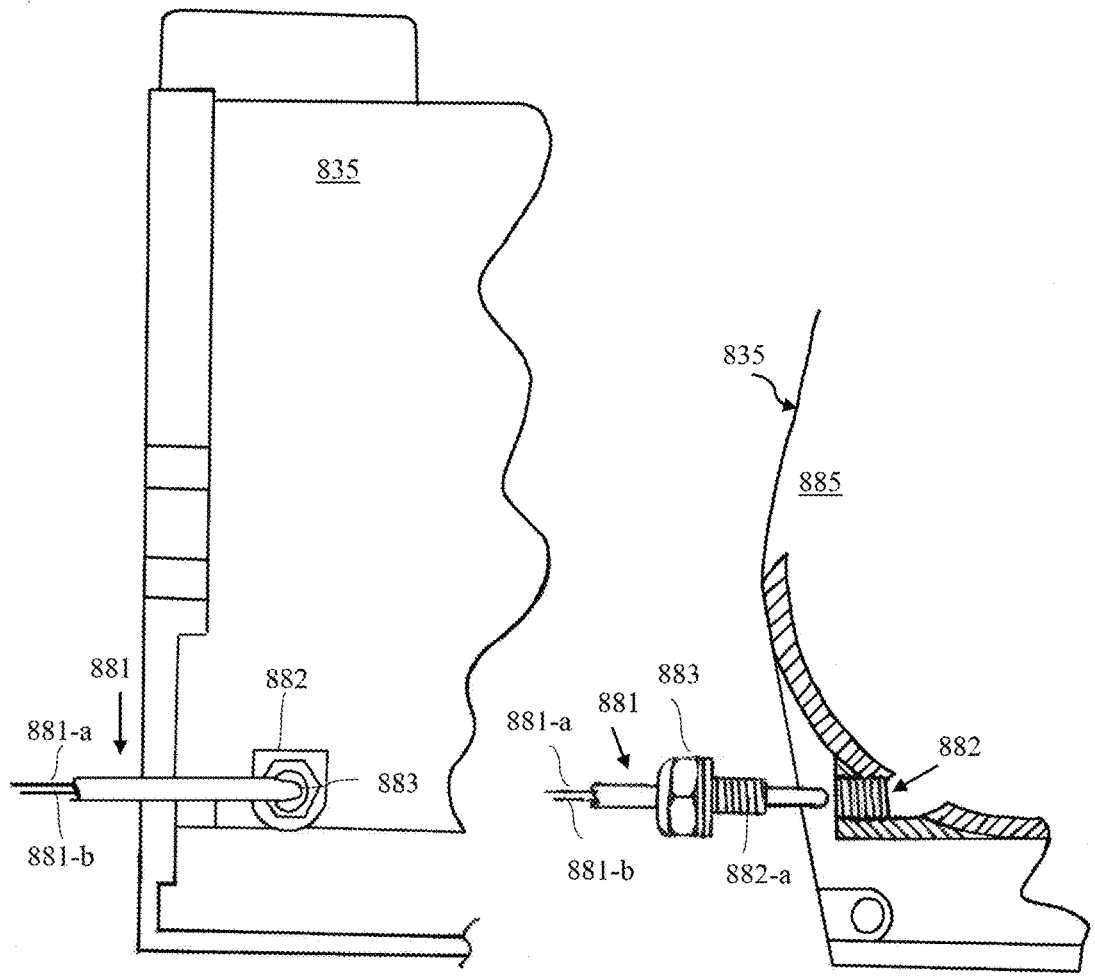
FIGS. 8b-c illustrate a partial side and a front view, respectively, of a pump with a run-dry sensor thermal switch, according to an embodiment.

FIGS. 8b-c illustrate a partial side and a front view, respectively, of a pump 835 with a run-dry sensor thermal switch 883, according to an embodiment. A thermal switch 883 may be associated with a wire lead 881 having two wires 881-a and 881-b and may be fastened, for example, into the back drain 882 of the pump 835, which drains water from the impeller cavity 885. The thermal switch 883 is preferably a high-limit probe sensor, a Normally Closed (N.C.) relay, such that the circuit is normally on. The probe sensor 883 may be fastened into the drain 882 by for example using threading 882-a. The thermal switch component 883 may be replaced with other similarly functioning components, such as a thermistor, resistance temperature detector, or thermocouple, and so on, if deemed suitable to be used as a temperature sensor.

The run-dry sensor 883 activates and opens (or closes depending on the type of sensor used) preferably when the temperature detected reaches 125° F.-135° F. A temperature as low as 114° F. may be used to activate and open (or close, again, depending on type of sensor used) the switch 883. This may open a switch as shown by 922 in the exemplary circuitry 919 shown in FIG. 9b. The activation may then turn off the circuit (e.g., circuit 922), shutting down the pump motor 800-a via programming or controls 887, indicating overheating, which may be an indicator of the pump 835 running dry. Next, after the pump fault is corrected, a reset button may be provided for restarting the pump motor, as discussed when referring to FIG. 1b.

FIG. 9a is an example of control circuitry 918 that may be used in connection with the seal leak sensor and the rain sensor and their operations described above when referring to FIGS. 2-7d, according to an embodiment.

Figure 9B:
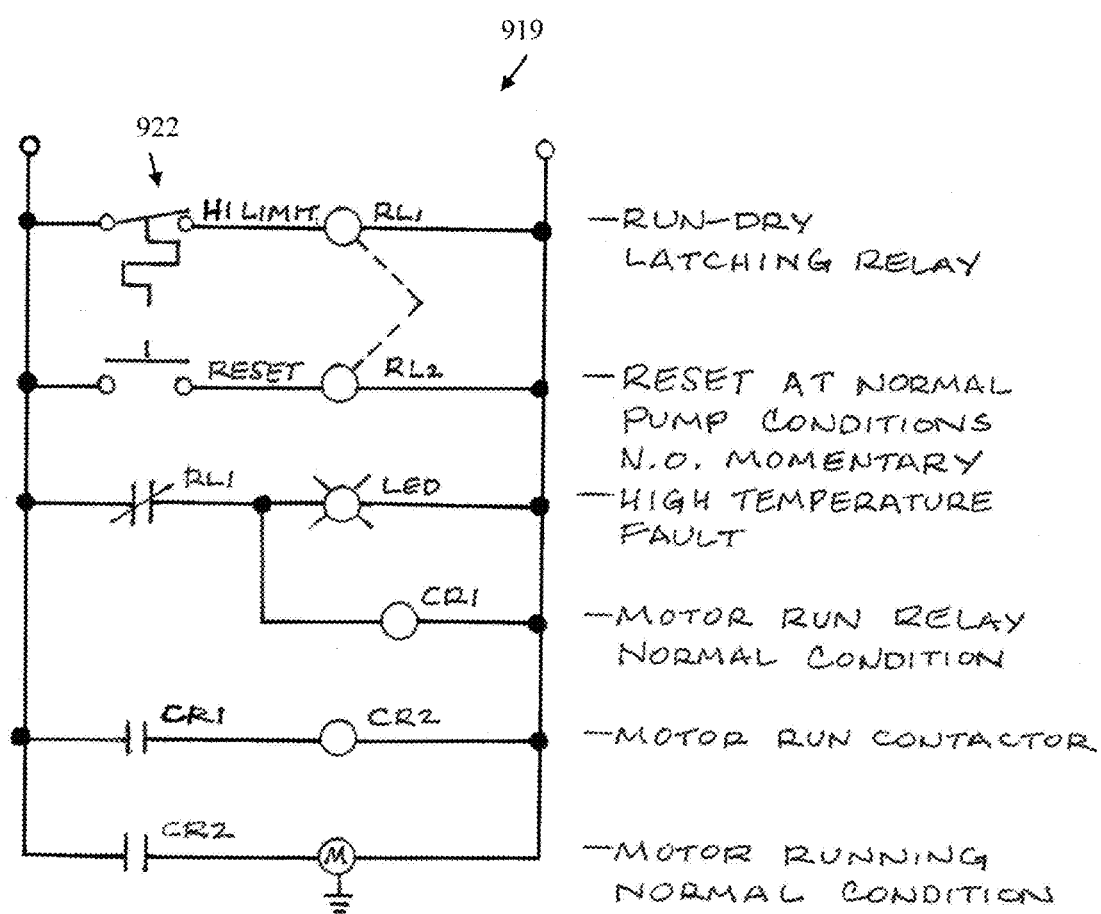
FIG. 9b is an example of control circuitry that may be used in connection with the run-dry sensor and/or other such similar sensors, and their operations described herein, according to an embodiment.

FIG. 9b is an example of control circuitry 919 that may be used in connection with the run-dry sensor and/or other such similar sensors, and their operations described above when referring to FIGS. 8a-8c, according to an embodiment.

Figure 9C:
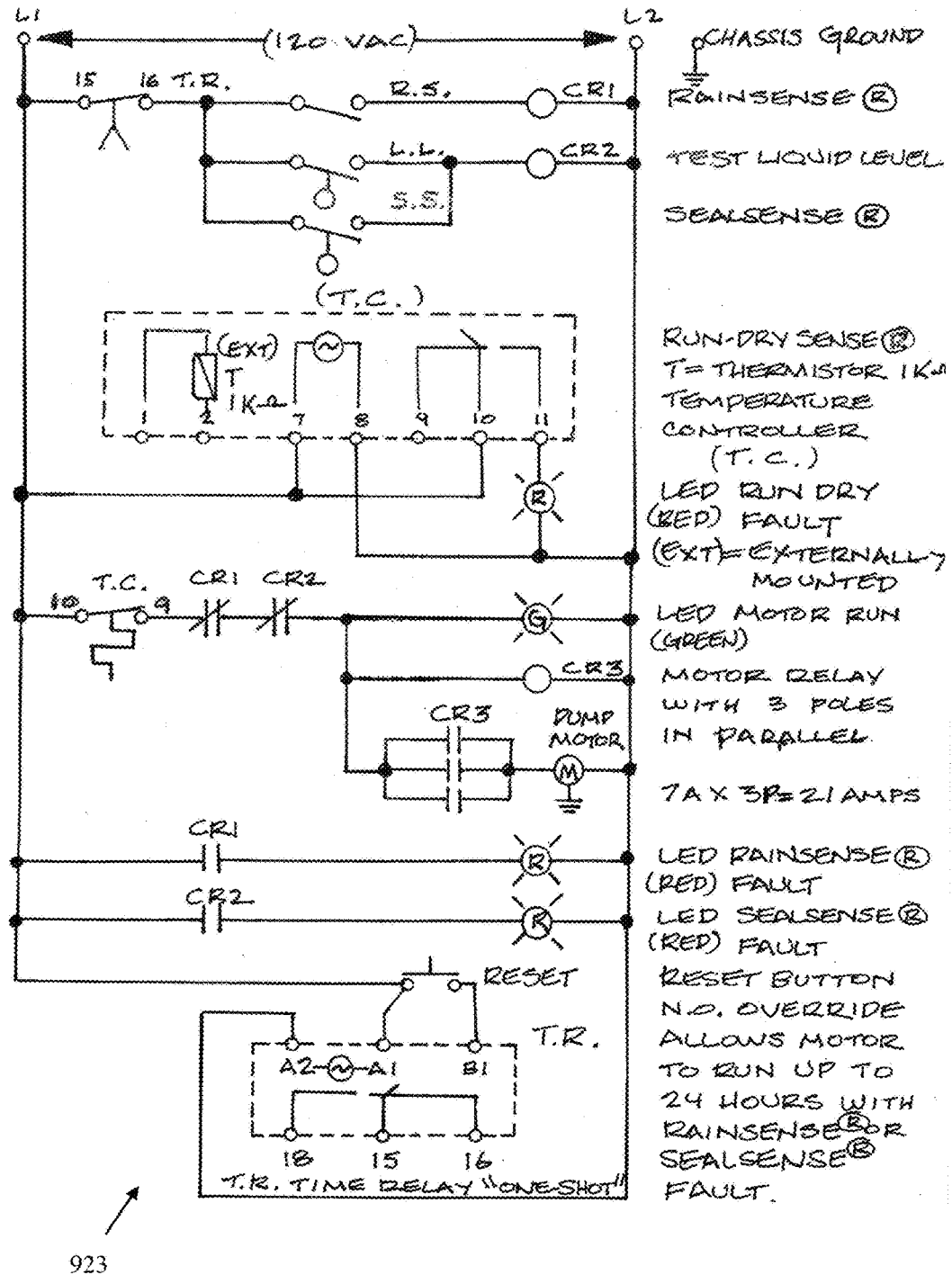
FIG. 9c is an example of control circuitry that may be used in connection with the seal leak sensor, rain sensor, and run dry sensor, and their operations described herein, according to an embodiment.

FIG. 9c is an example of control circuitry 923 that may be used in connection with the seal leak sensor, rain sensor, and run dry sensor, and their operations described herein, according to an embodiment.

Figure 10A:
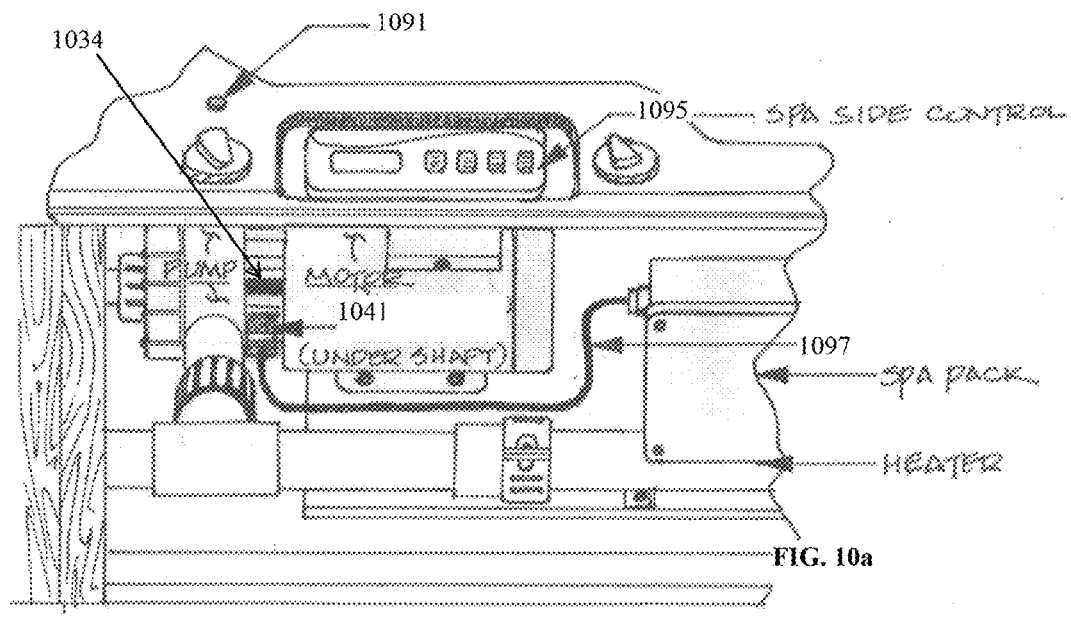
FIG. 10a is a top-perspective cutaway view of a spa incorporating a seal leak sensor.
Figure 10B:
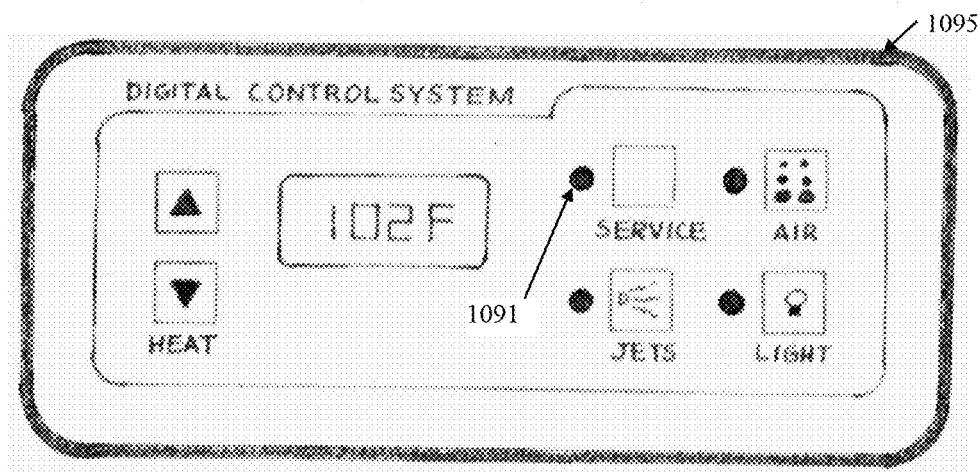
FIG. 10b is a schematic view of a spa side control panel incorporating a seal leak indicator.
Figure 10C:
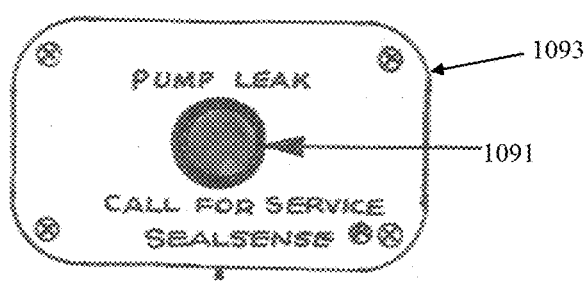
FIG. 10c is a schematic view of a seal leak indicator for a spa retrofitted to incorporate a seal leak sensor.

FIG. 10a is a top-perspective cutaway view of a spa incorporating a seal leak sensor. FIG. 10b is a schematic view of a spa side control panel incorporating a seal leak indicator. FIG. 10c is a schematic view of a seal leak indicator for a spa retrofitted to incorporate a seal leak sensor. As shown in FIG. 10a, a water sensor 1041 may be placed under the motor shaft 1034 to sense water leaking due to for example a damaged pump seal as described hereinbefore. The water sensor may then be in electrical communication with a leak indicator 1091 (e.g., an LED) via a low voltage wire 1097. Thus, when water is detected by sensor 1041, the LED 1091 will turn on to notify the spa owner/user about the pump seal leak and to call for service. In a retrofit situation, the leak indicator 1091 can be placed as shown in FIG. 10a near the existing spa control panel 1095 using for example a nonmetallic and water-tight enclosure 1093 (see FIG. 10c). During spa manufacturing, the leak indicator 1091 can be incorporated into the spa control panel 1095, as shown in FIG. 10b. As described hereinbefore, a "reset" and/or a "motor off" condition may be optionally included as well.

Portable above ground hot tubs or spas are notorious for leaking pump shaft seals unbeknownst to the user or owner. The shaft seals often leak due to improper chemical balance and may leak for weeks or months until eventually either the bearings go or the motor seizes. For example, type 48 and 56 frame spa pumps are generally $500-$700 installed to the consumer. This expense is preventable if the seats were replaced as soon as they begin leaking With the above described seal leak spa application this is achieved, and further, typically there is no need to add the rain and run-dry sensors described hereinbefore, as rain typically doesn't make its way into the spa cabinet and these pumps are gravity fed and thus rarely will ever run dry.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the described methods. Acts, elements and features discussed only in connection with one embodiment are not intended to be excluded from a similar role in other embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A module for protecting an electrical pump configured to pump a liquid and having a pump, a motor, a shaft housing disposed between the pump and the motor, a motor shaft arranged in a horizontal direction and positioned inside the shaft housing, and a pump seal for preventing the liquid from reaching inside the shaft housing, the module comprising: a circuitry, a collector positioned between a side of the motor shaft and an inner surface of the shaft housing, below the motor shaft inside the shaft housing and thus on a side of the pump seal facing the shaft housing, the collector having an opening facing the side of the motor shaft, and a liquid detection sensor positioned in the collector, the liquid detection sensor being adapted to send a signal to the circuitry to shut down the motor and generate a notice, when a portion of the liquid enters the collector due to a leak of the pump seal.

2. The module of claim 1, wherein the liquid is water.

3. The module of claim 2, wherein the collector is a tank.

4. The module of claim 1, wherein the collector is a portion of an inside cavity of the shaft housing.

5. The module of claim 1, wherein the notice is visual.

6. The module of claim 1, further comprising a reset button that can be actuated by a person to override the circuitry and allow the motor to run for a preset period of time.

7. The module of claim 3, wherein the tank provides 360 degrees of coverage around the motor shaft to collect any water traveling down the motor shaft and thus prevent it from reaching any other part inside of a motor housing.

8. The module of claim 7, further comprising a grommet that seals a joint between the motor shaft and the tank, thus preventing the advance of water or moisture from the motor shaft toward a front motor bearing, wherein the grommet has an oversized diameter that is a plurality of times greater than a diameter of the front motor bearing and a slopped back face to deflect water sprayed inside the shaft housing away from the front motor bearing.

9. The module of claim 3, wherein the tank is set at a 30 degrees angle between the bottom of the tank and horizontal.

10. The module of claim 1, wherein the liquid detection sensor is a float switch.

11. The module of claim 1, wherein the collector is a well positioned in a seal plate.

12. A pump apparatus adapted to pump a liquid, the pump apparatus comprising: a pump, a motor, a shaft housing disposed between the pump and the motor, a motor shaft arranged in a horizontal direction and positioned inside the shaft housing, a pump seal adapted to prevent the liquid from reaching inside the shaft housing, a collector positioned between a side of the motor shaft and an inner surface of the shaft housing, below the motor shaft inside the shaft housing and thus on a side of the pump seal facing the shaft housing, the collector having an opening facing the side of the motor shaft, and a liquid detection sensor positioned in the collector, the liquid detection sensor being adapted to send a signal to a circuitry to shut down the motor when a portion of the liquid enters the collector due to a leak of the pump seal.

* * * * *